United States Patent
Kawai

(10) Patent No.: US 7,680,095 B2
(45) Date of Patent: Mar. 16, 2010

(54) RADIO COMMUNICATION SYSTEM AND OVERHANG STATION APPARATUS

(75) Inventor: Hisashi Kawai, Sendai (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 502 days.

(21) Appl. No.: 11/806,227

(22) Filed: May 30, 2007

(65) Prior Publication Data
US 2007/0281643 A1    Dec. 6, 2007

(30) Foreign Application Priority Data

May 30, 2006 (JP) ............................. 2006-149796
Mar. 20, 2007 (JP) ............................. 2007-073307

(51) Int. Cl.
*H04J 3/06* (2006.01)
(52) U.S. Cl. .................... 370/350; 455/502; 455/450
(58) Field of Classification Search ........... 455/450, 455/500, 67.16, 67.13, 88, 127.3, 242.1, 455/242.2, 253.2, 556.2, 550.1, 524, 526, 455/502, 509, 423, 561, 115.1, 422.1, 560
See application file for complete search history.

(56) References Cited

U.S. PATENT DOCUMENTS

| | | | | |
|---|---|---|---|---|
| 6,373,834 B1 * | 4/2002 | Lundh et al. | ................ | 370/350 |
| 6,577,872 B1 * | 6/2003 | Lundh et al. | ................ | 455/502 |
| 6,647,026 B1 * | 11/2003 | Tanaka | ................ | 370/509 |
| 6,977,903 B1 * | 12/2005 | Ohtani et al. | ................ | 370/252 |
| 7,099,354 B2 * | 8/2006 | Keating | ................ | 370/519 |
| 2003/0143947 A1 * | 7/2003 | Lyu | ................ | 455/7 |

FOREIGN PATENT DOCUMENTS

| | | |
|---|---|---|
| JP | A 02-174428 | 7/1990 |
| JP | A 07-298347 | 11/1995 |
| JP | A 2006-174228 | 6/2006 |

\* cited by examiner

*Primary Examiner*—Kent Chang
*Assistant Examiner*—San Htun
(74) *Attorney, Agent, or Firm*—Oliff & Berridge, PLC

(57) ABSTRACT

Delay time in a signal transmitted between nodes in daisy chain connection is accurately compensated. A TRX amplifier measures phase difference between a UL frame received from a downstream chain, and a UL frame to be sent out to an upstream chain, and reports the phase difference to a base transceiver station. The base transceiver station calculates advance amount to be set to a downstream TRX amplifier based on the reported phase difference. The TRX amplifier adjusts phase difference between a DL frame received from an upstream chain, and the UL frame to be sent out to the upstream chain depending on the advance amount.

5 Claims, 10 Drawing Sheets

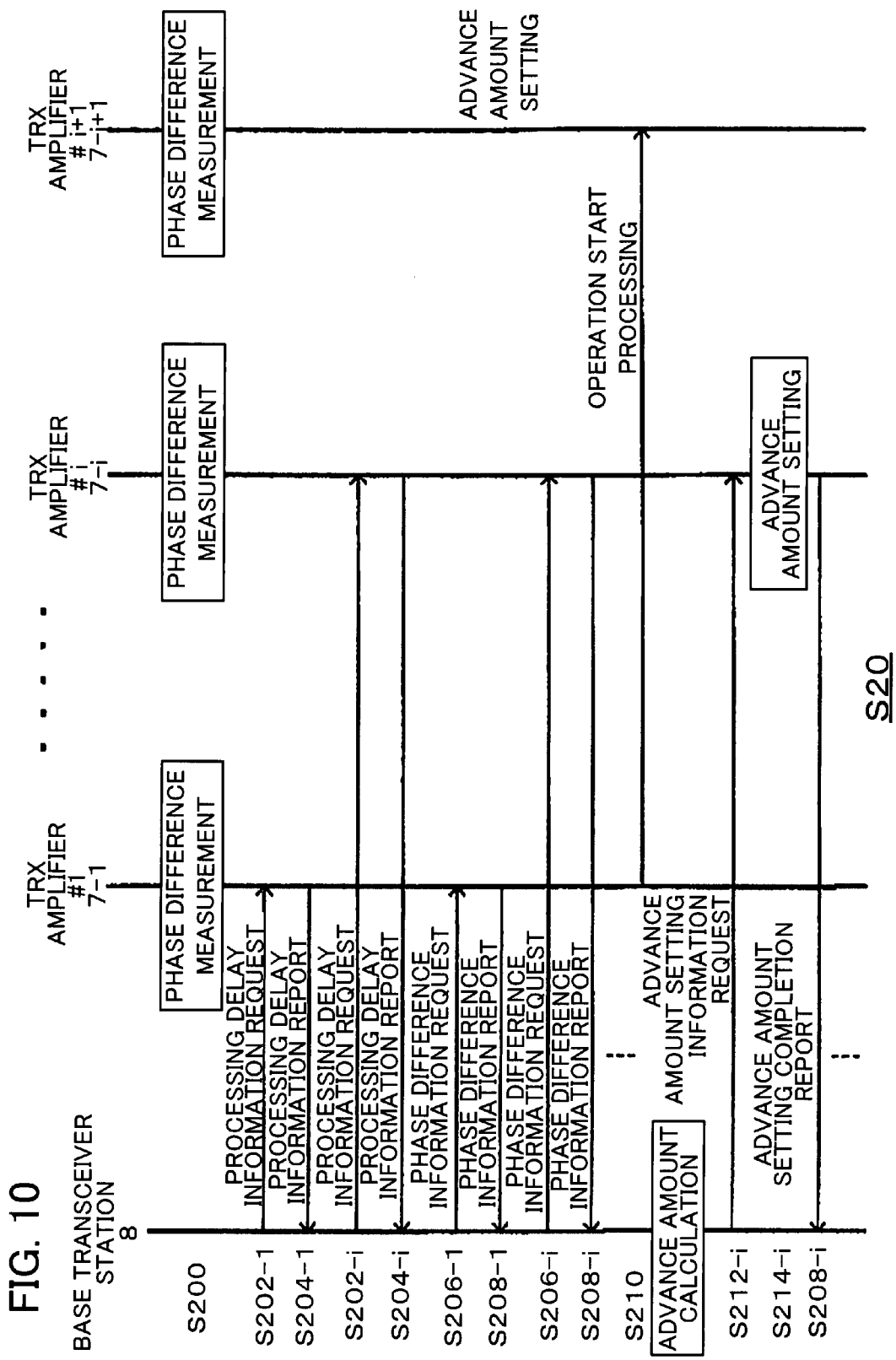

RADIO COMMUNICATION SYSTEM AND OVERHANG STATION APPARATUS

BACKGROUND OF THE INVENTION

1. Field of the Invention

The present invention relates to a radio communication system and an overhang station apparatus, and particularly relates to a radio communication system for optically transmitting a digital baseband radio signal or the like.

2. Description of Related Art

A base transceiver station used for a radio communication system such as mobile phone has a transmission amplifier or an antenna for sufficiently transmitting a radio signal into a base transceiver station cell, in addition to a main function such as call processing to enable radio access from a plurality of subscriber stations. Typically, all of such function means are accommodated in one station building directly under an antenna tower, and particularly in the case that the antenna is installed on a roof of a tall building possessed by a third party, there is a difficulty that when the base transceiver station is also installed in the building, maintenance of the base transceiver station becomes hard, and there is a difficulty that when the base transceiver station is installed in a place suitable for easy maintenance, loss in high frequency cable is increased between the base transceiver station and the antenna.

To overcome such difficulties, a configuration is devised: a radio section such as the transmission amplifier is separated from the base transceiver station, and both are connected by an optical fiber, and standardization including CPRI (Common Public Radio Interface) and OBSAI (Open Base Station Standard Initiative) is underway (for example, see the CPRI standard as non-patent document 1). While the separated radio section is generally called RRH (Remote Radio Head), or called Radio Equipment in CPRI, it is called transmitter and receiver (TRX) amplifier in the specification hereinafter. On the other hand, since the base transceiver station can be installed in an arbitrary place without any restriction, base transceiver stations for a plurality of cells are integrated in one place, consequently they can be installed at reduced cost. Configurations for connecting between the integrated base transceiver station and the distributed TRX amplifiers are roughly divided into Star topology in which the base transceiver station is directly connected to each of the TRX amplifiers, and Chain topology in which the TRX amplifiers are in cascade (daisy chain) connection with one another.

FIG. 1 is a diagram showing a configuration of a usual radio communication system 1, which is supposed to be based on CPRI.

The radio communication system 1 includes a radio network controller (RNC) 100, a base transceiver station 102, TRX amplifiers 2-1 to 2-$n$ (n is an integer of 1 or more), and mobile stations 104-1 to 104-$m$ (m is an integer of 1 or more).

The base transceiver station 102 and the TRX amplifiers 2-1 to 2-$n$ are connected in series via a digital optical fiber line or the like.

Furthermore, the TRX amplifiers 2-1 to 2-$n$ form corresponding cells (sectors) respectively, and connected to the mobile stations 104-1 to 104-$m$ in the cells via radio communication lines.

In the following figures, unnecessary components for description of an embodiment of the invention are appropriately omitted for specific and clear representation.

Furthermore, hereinafter, when a plurality of components such as the TRX amplifiers 2-1 to 2-$n$ are shown without specifying one of them, they may be abbreviated as simply TRX amplifiers 2.

The RNC 100 sets calls in the base transceiver station 102 and other base transceiver stations, and controls such base transceiver stations. Moreover, the RNC 100 transmits and receives user data being wirelessly communicated between the relevant user and the base transceiver station 102.

The base transceiver station 102 receives a signal from the RNC 100, and generates a baseband signal (IQ-data) corresponding to each carrier wave of each cell by a typical function of a base transceiver station, and transmits the baseband signal to the TRX amplifier 2-1. Moreover, the base transceiver station 102 receives IQ-data from the TRX amplifier 2-1, and performs typical processing to the IQ-data and then transmits the IQ-data to the RNC 100.

The TRX amplifier 2-1 relays a signal such as IQ-data between the base transceiver station 102 and the TRX amplifier 2-2.

The TRX amplifier 2-2 relays a signal between the TRX amplifier 2-1 and the TRX amplifier 2-3. After that, similarly, a TRX amplifier 2-$i$ (i is an integer of 2 or more and not more than n−1) relays a signal between a TRX amplifier 2-($i$−1) and a TRX amplifier 2-($i$+1).

As above, each of the TRX amplifiers 2-1 to 2-$n$ and the base transceiver station 102 transmits and receives a signal to/from each other.

The TRX amplifier 2-$i$ wirelessly receives an uplink signal from the mobile station 104, and performs processing such as amplification, analog to digital conversion, and orthogonal demodulation to convert the signal into IQ-data, and then transmits the IQ-data to the TRX amplifier 2-($i$−1), in addition, receives IQ-data to the amplifier 2-$i$ itself from the TRX amplifier 2-($i$−1), and performs processing such as digital to analog conversion, orthogonal demodulation of a carrier, and amplification, and then transmits the IQ-data to the mobile station.

Downlink (DL) means signal transmission from the base transceiver station to the mobile station or a direction of the transmission, in addition, the specification uses it as a meaning of a signal transmission direction such as a direction from the base transceiver station 102 to the TRX amplifier 2-1 or a direction from the TRX amplifier 2-1 to the TRX amplifier 2-2 in an arbitrary area between the base transceiver station 102 and the mobile station. This is similar in uplink (UL). Viewing from an arbitrary TRX amplifier, a base transceiver station side is called upstream, and a mobile station side is called downstream.

The mobile stations 104-1 to 104-$m$ transmit and receive signals to/from the TRX amplifiers 2 respectively.

IQ-data transmitted between the base transceiver station and each of the TRX amplifiers 2 is a digital baseband signal at a chip rate in the downlink (DL), and a digital baseband signal at a sample rate twice as high as the chip rate in the uplink (UP).

In both DL and UL, IQ-data for a plurality of TRX amplifiers 2 are accommodated in first to fifteenth words of a basic frame including 16 words. A $0^{th}$ word (leading word) is allocated to a control word. Each word includes 8 bits or integral multiple of it. One basic frame period is equal to one chip time Tc (1/3.84 MHz).

Moreover, a hyper frame is configured with 256 basic frames as a unit. A leading word of a basic frame at a lead of the hyper frame is a synchronous byte (K28.5 code) showing the lead of the hyper frame. Hereinafter, the synchronous byte is called header. Other leading words are used for transmission of a plurality of subchannels (Synchronization and timing, Slow C&M link, Fast C&M link, L1 inband protocol, and Vender specific) by time division multiplex in a unit of hyper frame. Among the subchannels, subchannels except for Vender specific are called C (Control and management) plane data. On the contrary, IQ-data of the first to fifteenth words are called U (User) plane data.

Furthermore, a UMTS Node B frame with 150 hyper frames as a unit is defined.

The frames are converted into serial signals using the 8B10B code, and transmitted through a digital optical fiber line.

Generally, synchronization is often necessary between base transceiver stations configuring cells in a radio access system, and synchronization is indispensable in the case of performing site diversity. The site diversity is applied, for example in the CDMA system, to location service in which a position of a mobile station as a source is estimated from transmission delay when a plurality of base transceiver stations receive a signal from the source.

Therefore, again in the radio communication system 1, it is important that the base transceiver station 102 recognizes and controls processing delay amount between the base transceiver station 102 and each of the TRX amplifiers 2.

For example, "4. 2. 9 Link Delay Accuracy and Cable Delay Calibration" in the CPRI standard as the non-patent document 1 describes a method of adjusting delay in the Star topology and the Chain topology.

FIG. 2 is a diagram showing definition of delay in each section of the radio communication system 1 cited from the non-patent document 1, wherein a case of n=2 is shown.

In the base transceiver station 102, R1 is an output end of the base transceiver station, and R4 is an input end of the base transceiver station.

In the TRX amplifier 2-1, RB2 is an input end of a slave port, RB3 is an output end of the slave port, RB1 is an output end of a master port, and RB4 is an input end of the master port. Here, the master port is a port for outputting a DL signal, and inputting a UL signal (a port seen to be equivalent to R1 or R4 of the base transceiver station for an object to be connected thereto), and the reverse holds in the slave port.

R2 provided in the TRX amplifier 2-2 is an input end of a slave port, R3 is an output end of the slave port, and Ra is an antenna end. Each end is defined in logical connection of a baseband signal (IQ-data) to be transmitted.

Each TRX amplifier 2 is operated based on a clock reproduced from a frame signal inputted into R2.

$T12^{(1)}$ is delay amount from R1 of the base transceiver station 102 to RB1 of the TRX amplifier 2-1, and $T12^{(2)}$ is delay amount from RB1 of the TRX amplifier 2-1 to R2 of the TRX amplifier 2-2.

TBdelayDL$^{(1)}$ is delay amount from RB2 to RB1 of the TRX amplifier 2-1, and T2a is processing delay amount from R2 to Ra of the TRX amplifier 2-2.

$T34^{(1)}$ is delay amount from the output end RB3 of the TRX amplifier 2-1 to R4 of the base transceiver station, and $T34^{(2)}$ is delay amount from R3 of the TRX amplifier 2-2 to RB4 of the TRX amplifier 2-1.

TBdelayUL$^{(1)}$ is processing delay amount from RB4 to RB3 of the TRX amplifier 2-1, and T3a is processing delay amount from Ra to R3 of the TRX amplifier 2-2.

$T14^{(1)}$ is time difference between a header (frame timing) of output and a header of input at a master port end of the base transceiver station.

Toffset is time difference between a header inputted from R2 and a header outputted from R3 of the TRX amplifier 2-2, and set so as to be substantially equal to total time of processing delay (T2a) at a DL side and processing delay (Ta3) at a UL side of the TRX amplifier 2-2.

Toffset$^{(1)}$ is also set so as to be substantially equal to total time of processing delay (delay from RB2 to the antenna) at a DL side and processing delay at a UL side of the TRX amplifier 2-1.

FIG. 3 is a frame timing chart of DL and UL of the radio communication system 1 cited from the CPRI standard as the non-patent document 1.

T12 is delay in a period from R1 of the base transceiver station 102 to R2 of the terminal TRX amplifier 2-2, and $T12 = T12^{(1)} + TBdelayDL^{(1)} + T12^{(2)}$ is given.

T34 is delay in a period from R3 of the terminal TRX amplifier 2-2 to R4 of the base transceiver station 102, and $T34 = T34^{(1)} + TBdelayUL^{(1)} + T34^{(2)}$ is given.

T14 is delay in IQ-data in a period from a point when the IQ-data are outputted from R1 of the base transceiver station 102 to a point when they are returned to R4 via the TRX amplifier 2-2, and $T14 = T12 + Toffset + T34$ is given.

On the other hand, $T14^{(1)}$ being delay in frame timing observed in the base transceiver station 102 is different from T14 because Toffset$^{(1)}$ is determined in the inside of the TRX amplifier 2-1 irrespective of delay in downstream, and $T14^{(1)} = T12^{(1)} + Toffset^{(1)} + T34^{(1)}$ is given.

BFN is a UMTS Node B frame number, and HFN is a hyper frame number. The TRX amplifiers 2 essentially use BFN and HFN received in DL as they are in UL.

As shown in the lowest frame timing in FIG. 3, $T14 - T14^{(1)} = Tc \times N^{(1)}$ ($N^{(1)}$ is an arbitrary integer)

is obtained in the CPRI standard.

That is, IQ-data from the TRX amplifier 2-2 may be accommodated in a basic frame, which is n frames later than the same basic frame as that of the TRX amplifier 2-1, rather than the same basic frame.

As expressed by the following expression, $T14 - T14^{(1)}$ is difference between roundtrip time from an input end to an output end of the slave port of the TRX amplifier 2-1 via the TRX amplifier 2-1, and Toffset$^{(1)}$ in the inside of the TRX amplifier 2-1, and called roundtrip time difference hereinafter.

$T14 - T14^{(1)} = TBdelayDL^{(1)} + T12^{(2)} + Toffset^{(2)} + T34^{(2)} + TBdelayUL^{(1)} - Toffset^{(1)}$ When all of TBdelayDL$^{(i)}$, TBdelayUL$^{(i)}$, Toffset$^{(i)}$, Toffset$^{(i+1)}$, and $N^{(i)}$ are known in the base transceiver station, $T12^{(i+1)} + T34^{(i+1)}$ can be calculated from them. That is, $T12^{(i+1)} + T34^{(i+1)} = Tc \times N^{(i)} + Toffset^{(i)} - (TBdelayDL^{(i)} + Toffset^{(i+1)} + TBdelayUL^{(i)})$ is given.

Moreover, since an assumption of $T12^{(i+1)} = T34^{(i+1)}$ is made with a sufficiently small error compared with Tc, $T12^{(i+1)}$ and $T34^{(i+1)}$ can be individually obtained.

While T12 or T34, which is delay in an optical cable, is large compared with other processing delay, and may reach to a few hundred of chips, it is not ensured to be in a unit of chip. Moreover, uncertainty in delay exists in a Serdes device while it is slight.

In addition, as a related art on an embodiment of the invention, JP-A-2-174428 discloses a delay adjustment method in which sending timing of signals, which are transmitted by a plurality of radio base transceiver stations in cascade connection, to a control station is made equal in all the radio base transceiver stations.

Moreover, JP-A-7-298347 discloses a method in which a central control station to be connected to a plurality of radio base transceiver stations performs control by estimating transmission delay amount based on phase difference between an uplink frame and a downlink frame.

Patent document 1: JP-A-2-174428.
Patent document 2: JP-A-7-298347.

SUMMARY OF THE INVENTION

However, the usual radio communication system 1 does not clearly show a method of accurately separating TBdelayDL$^{(i)}$+T12$^{(i+1)}$ and TBdelayUL$^{(i)}$+T34$^{(i+1)}$ from each other.

FIG. 4 is a timing chart of a UL frame inputted into the master port (RB4) and a UL frame outputted from the slave port (RB3), which are supposed in the TRX amplifier, showing FIG. 3 in detail. In the specification, Tphase is defined as follows.

$$Tphase^{(i)}=TBdelayDL^{(i)}+T12^{(i+1)}+Toffset^{(i+1)}+T34^{(i+1)}-Toffset^{(i)} \quad \text{(Expression 1)}.$$

Timing of a header outputted from RB3 is defined as timing being delayed by Toffset$^{(i)}$ from timing of header input into RB1.

On the other hand, timing of header input into RB4 is timing being delayed by TBdelayDL$^{(i)}$+T12$^{(i+1)}$+Toffset$^{(i+1)}$+T34$^{(i+1)}$ from the timing of header input into RB1, which is completely arbitrary. Tphase$^{(i)}$ being difference between them is not always in a unit of Tc.

Each of the basic frames of the UL frames inputted from RB4 previously stores IQ-data received by a downstream TRX amplifier, and time corresponding to TBdelayUL$^{(i)}$ is required for outputting the IQ-data from RB3 with further storing IQ-data received by a TRX amplifier itself and, the sum of Tphase$^{(i)}$ and TBdelayUL$^{(i)}$ corresponds to difference in round trip time Tc×N$^{(i)}$. Therefore, TBdelayUL$^{(i)}$ also includes fraction delay Tfrc being less than 1 Tc.

If the fraction delay Tfrc in the TBdelayUL$^{(i)}$ is not appropriately handled, such errors are accumulated with increase in number of chains n, and may exceed Tc at n=3. For example, when TBdelayUL in which Tfrc is continuously rounded down is used for calculation, TBdelayDL$^{(i)}$+T12$^{(i+1)}$ is estimated large compared with an actual value, and T34$^{(i+1)}$+TBdelayUL$^{(i)}$ is estimated small.

Alternatively, a method is considered; Toffset is adjusted rather than TBdelayUL to make Tfrc 0 to prevent accumulation of errors. However, since an architecture in which frame timing depends on downstream is insufficient in flexibility for adding or deleting a chain, in addition, it has a defect that a trouble in a TRX amplifier 2 in a downstream chain affects the whole system, the architecture needs to be improved in some way.

The invention was made based on the above background, and an object of the invention is to provide a radio communication system in which delay time in a signal transmitted between nodes can be accurately recognized, and a method of achieving the system.

To achieve the object, a radio communication system according to an embodiment of the invention is a system in which a signal is transmitted and received between an adjustment node and a plurality of measurement nodes, and each of the measurement nodes transmits and receives a radio signal with respect to at least one mobile node; wherein when each of the plurality of measurement nodes receives a signal from one of other measurement nodes, the measurement node relays the received signal to one of the measurement nodes other than the relevant measurement node, or the adjustment node, and when the measurement node receives a signal from the adjustment node, the measurement node relays the received signal to one of other measurement nodes, and each of the measurement nodes comprises a phase difference detection means for detecting phase difference between the received signal and the relayed signal, a phase difference notice means for notifying the detected phase difference to the adjustment node, and a timing adjustment means for adjusting timing at which a signal received from the mobile node is transmitted to another measurement node based on correction amount sent from the adjustment node, and the adjustment node comprises a correction amount calculation means for calculating correction amount for correcting the notified phase difference, and a correction amount transmission means for transmitting the calculated correction amount to a measurement node that relayed a signal to a measurement node by which the phase difference was notified.

An overhang station apparatus according to an embodiment of the invention is an overhang station apparatus (4) used for a radio communication system comprising a base transceiver station, and a plurality of overhang station apparatuses that are in daisy chain connection to the base transceiver station through digital optical transmission paths, and perform transmission and reception of radio signals with respect to terminals in cells being formed respectively, including a slave interface circuit (201, 203) that is connected to an upstream chain, and performs reception of a downlink frame, transmission of an uplink frame, light to electricity conversion, and serial to parallel conversion, a second interface circuit (202, 204) that is connected to a downstream chain, and performs transmission of a downlink frame, reception of an uplink frame, light to electricity conversion, and serial to parallel conversion, and outputs a master frame to a downstream chain, the master frame being directly derived from the slave interface circuit without accompanying regeneration of a frame, a format conversion circuit (208) for extracting radio signal data to be transmitted by the relevant overhang station apparatus from a frame inputted from the slave interface circuit, an up-conversion circuit (218) for up-converting radio signal data inputted from the format conversion circuit to radio frequency, and outputting the up-converted data to an antenna, a down-conversion circuit (220) for down-converting a radio signal received from the antenna, a transmission data delay adjustment circuit (232) for adjusting time T2a being time from a point when radio signal data were inputted into the slave interface circuit to a point when the data are sent out from the antenna, a reception data delay adjustment circuit (234) for adjusting time Ta3 being time from a point when radio signal data were inputted into the antenna to a point when the data are sent out from the slave interface circuit, an offset circuit (206, 210, 212) for allowing time Toffset to substantially correspond to sum of the time T2a and the time Ta3, the time Toffset being time from a point when a downlink frame was inputted into the slave interface circuit to a point when an uplink frame corresponding to the downlink frame is outputted from the slave interface circuit, a phase difference detection circuit (226) for measuring time Tphase being time from a point when an uplink frame was outputted from the slave interface circuit to a point when an uplink frame corresponding to the relevant uplink frame is inputted into a master interface circuit, and a control circuit (216) for reporting time TBdelayDL and a numerical value based on the time Tphase to the base transceiver station, the time TBdelayDL being time from a point when a downlink frame was inputted into the slave interface circuit to a point when an uplink frame corresponding to the relevant downlink frame is outputted from the slave interface circuit.

Furthermore, the overhang station apparatus according to an embodiment of the invention is an overhang station apparatus, wherein the control circuit reports the time Toffset, the time TBdelayDL, time TBdelayUL, and an integer value corresponding to sum of the time Tphase and the time TBdelayUL to the base transceiver station, the time TBdelayUL being time from a point when an uplink frame including certain radio signal data was inputted into the slave interface circuit to a point when an uplink frame including the radio signal data is outputted from the slave interface circuit, each of the master interface circuit and the slave interface circuit has delay time errors in uplink and downlink, the errors in uplink and downlink being zero or in a positive correlation, and the time TBdelayDL and the time TBdelayUL include average values of delay time in the master interface circuit and the slave interface circuit.

The overhang station apparatus according to an embodiment of the invention is an overhang station apparatus, wherein the control circuit reports an initial value of the time Toffset, the time TBdelayDL, time TBdelayUL, and an integer value N corresponding to sum of the time Tphase and the time TBdelayUL to the base transceiver station, the time TBdelayUL being time from a point when an uplink frame including certain radio signal data was inputted into the slave interface circuit to a point when an uplink frame including the radio signal data is outputted from the slave interface circuit, and sets delay requested from the base transceiver station to the transmission data delay adjustment circuit and the reception data delay adjustment circuit, and in response to time TBdelayDL, time TBdelayUL, and N reported from an overhang station apparatus, the base transceiver station requests an overhang station apparatus being next downstream with respect to the relevant overhang station apparatus to decrease delay in the transmission data delay adjustment circuit by Tc·N/2−(TBdelayUL−TBdelayDL)/2, and decrease delay in the reception data delay adjustment circuit by Tc·N/2+(TBdelayUL−TBdelayDL)/2.

The overhang station apparatus according to an embodiment of the invention is an overhang station apparatus, wherein the control circuit reports an initial value of the time Toffset, the time TBdelayDL, and the time Tphase to the base transceiver station, and sets delay requested from the base transceiver station to the transmission data delay adjustment circuit and the reception data delay adjustment circuit, and in response to time TBdelayDL, time TBdelayUL, and N reported from an overhang station apparatus, the base transceiver station requests an overhang station apparatus being next downstream with respect to the relevant overhang station apparatus to decrease delay in the transmission data delay adjustment circuit by Tphase/2+TBdelayDL, and decrease delay in the reception data delay adjustment circuit by Tphase/2.

According to an embodiment of the invention, delay time in a signal transmitted between nodes can be accurately recognized.

BRIEF DESCRIPTION OF THE DRAWINGS

FIG. 10 is a sequence diagram showing operation for setting advance amount to a TRX amplifier by the base transceiver station 8 according to the example 2.

DESCRIPTION OF THE PREFERRED EMBODIMENT

Hereinafter, a plurality of radio communication systems which are supposed to be based on CPRI are described. It is assumed that terms are defined based on the CPRI standard as the non-patent document 1, if not otherwise specified.

Example 1

A radio communication system 3 according to the example 1 is summarized in that a TRX amplifier 4-$i$ accurately measures TBdelayUL$^{(i)}$, and reports it to a base transceiver station together with TBdelayDL$^{(i)}$, Toffset$^{(i)}$, and N$^{(i)}$.

The TRX amplifier 4-$i$ appropriately includes a means for measuring TBdelayUL$^{(i)}$, and a delay adjustment means for adjusting time for UL frame generation processing to be constant. Moreover, the TRX amplifier 4-$i$ simply relays a DL frame to a downstream TRX amplifier 4-$i$ without processing the DL frame, thereby it makes TBdelayDL$^{(i)}$ to be a fixed value of approximately 0.

The TRX amplifier 4-$i$ is designed aiming that errors in TBdelayUL$^{(i)}$ and errors in TBdelayDL$^{(i)}$ are not in a negative correlation, and an expectation value (average value) of errors is close to 0.

Figure 1:
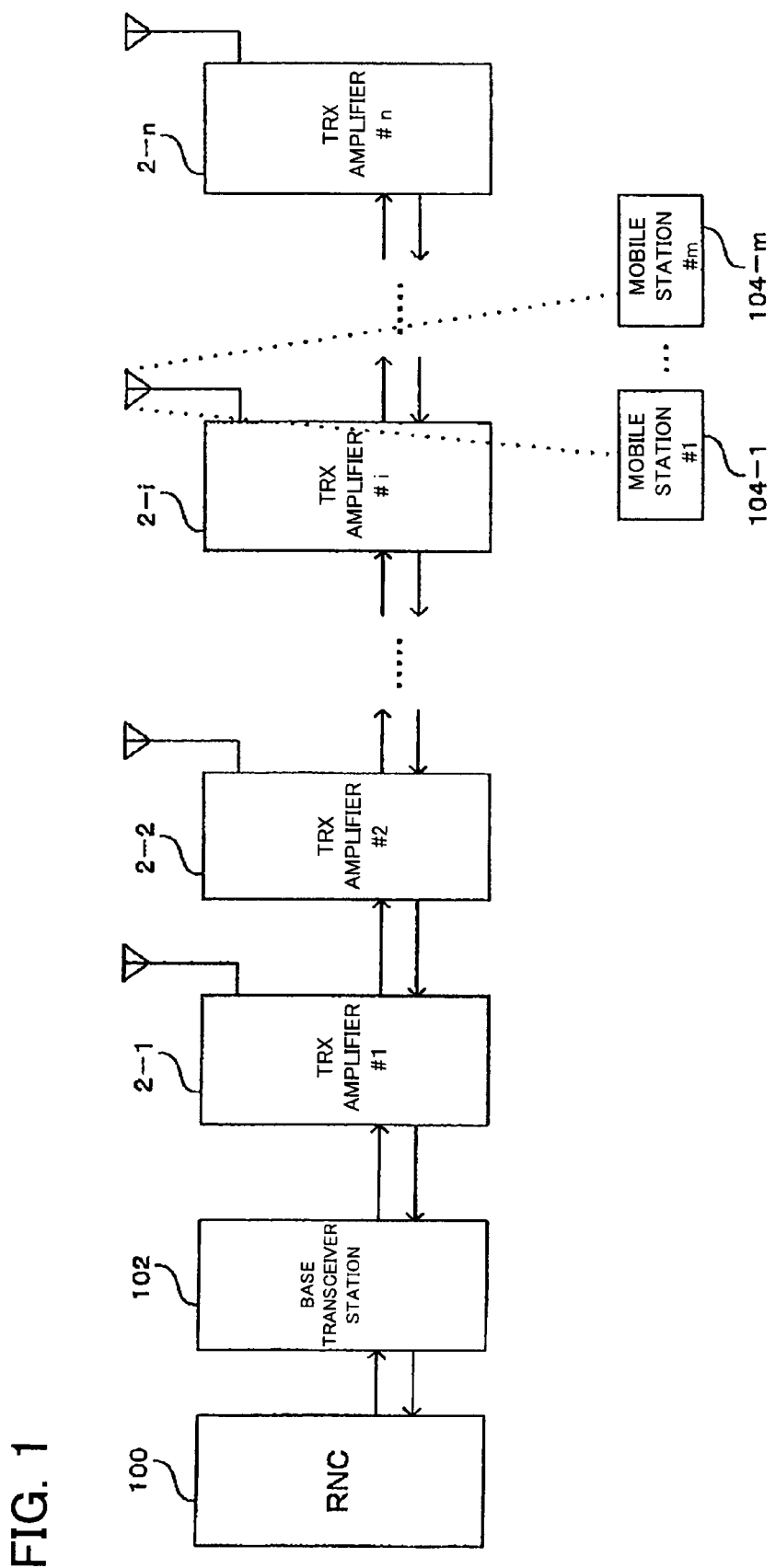
FIG. 1 is a block diagram of a usual radio communication system 1.
Figure 2:
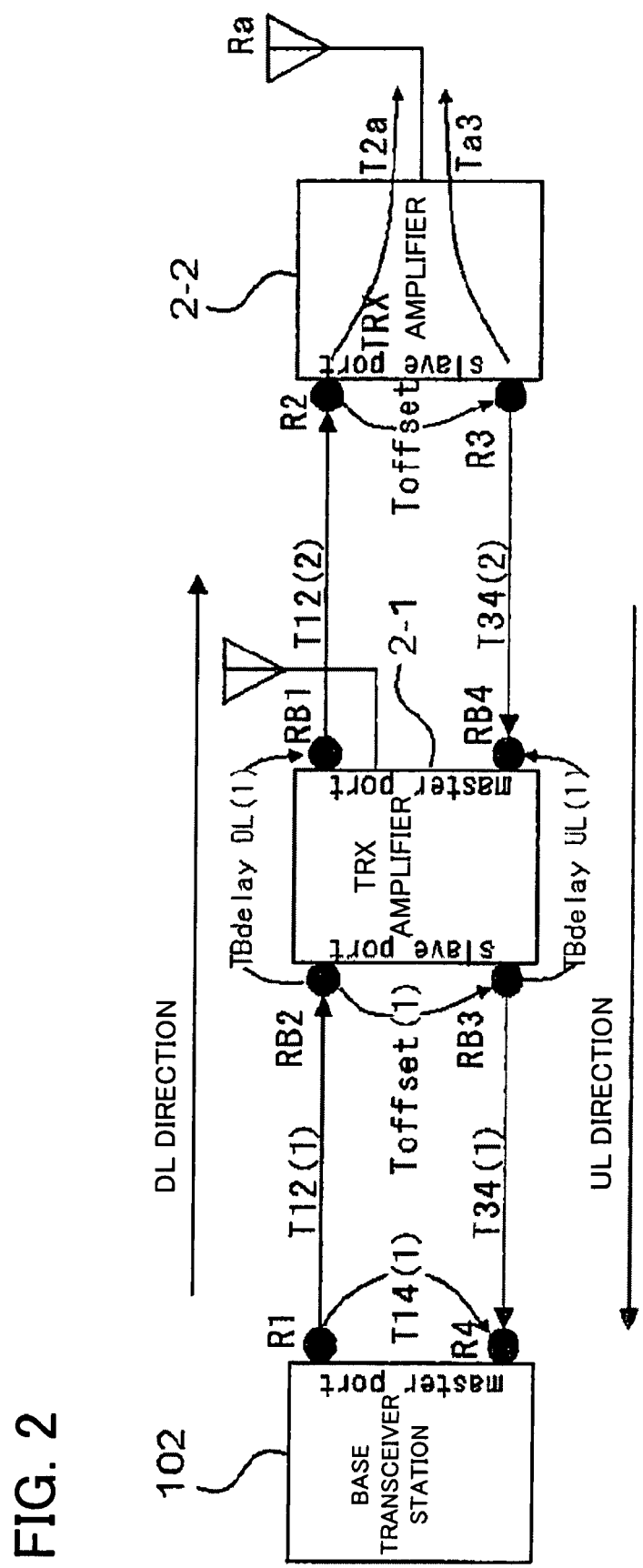
FIG. 2 is a diagram of definition of delay in each section of the radio communication system 1.
Figure 3:
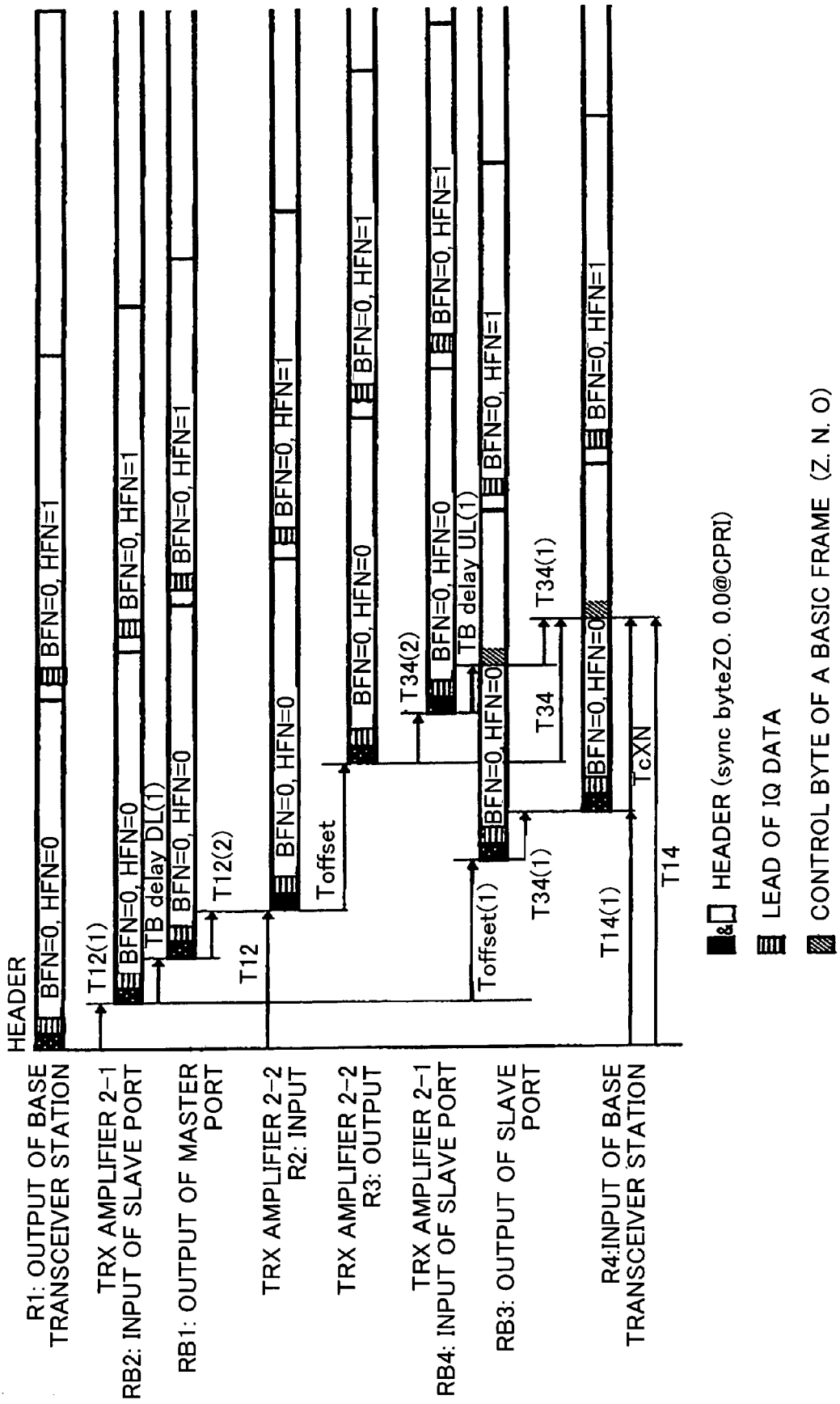
FIG. 3 is a frame timing chart of DL and UL in the radio communication system 1.
Figure 4:
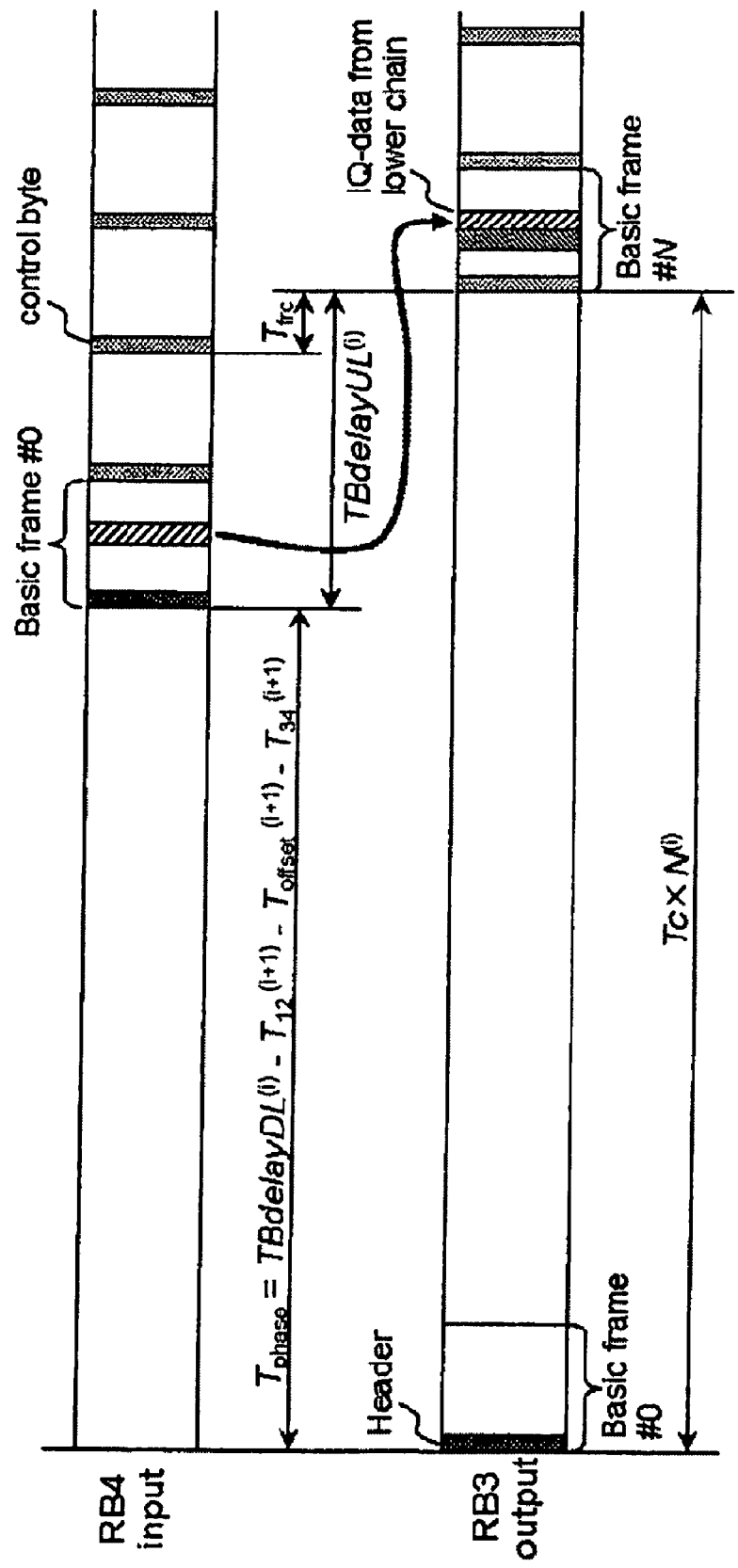
FIG. 4 is a timing chart of a frame inputted into a master port and a frame outputted from a slave port.

A configuration of radio communication system of the example 1 is the same as a usual configuration in FIG. 1, and includes RNC 100, a base transceiver station 5, TRX amplifiers 4-1 to 4-$n$, and mobile stations 104-1 to 104-$m$.

Figure 5:
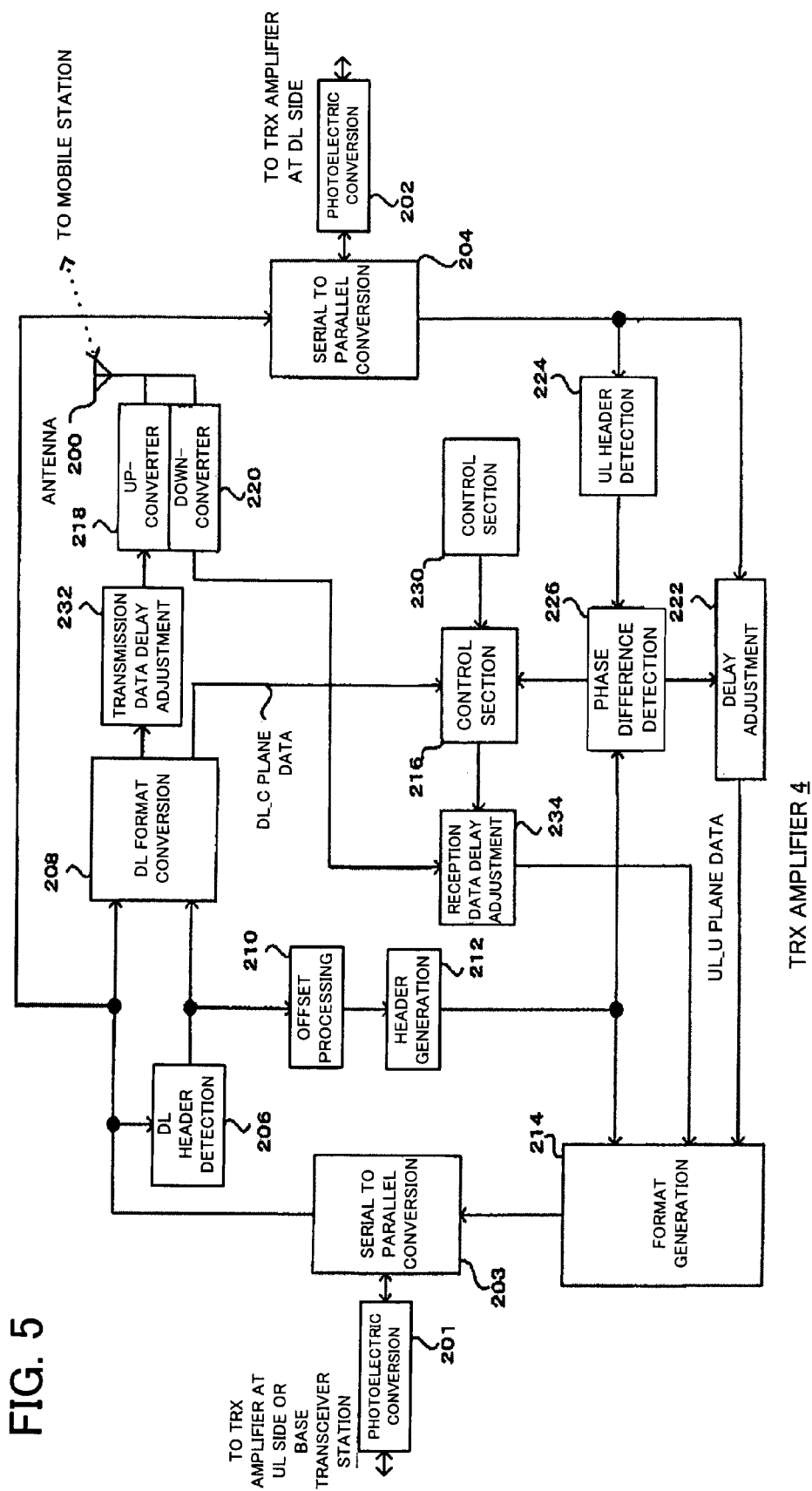
FIG. 5 is a block diagram of a TRX amplifier 4 in a radio communication system 3 according to example 1.

FIG. 5 is a block diagram of the TRX amplifier 4 in the radio communication system 3 according to the example 1.

As shown in FIG. 5, the TRX amplifier 4 includes an antenna 200, photoelectric conversion sections 201 and 202, serial to parallel conversion sections 203 and 204, a DL header detection section 206, a DL format conversion section 208, an offset processing section 210, a header generation section 212, a format generation section 214, a control section 216, an up-converter 218, a down-converter 220, a delay adjustment section 222, a UL header detection section 224, a phase difference detection section 226, a storage section 230, a transmission data delay adjustment section 232, and a reception data delay adjustment section 234.

The photoelectric conversion section 201 receives a DL light signal from a slave port, the light signal being transmitted from an upstream TRX amplifier 4 or a base transceiver station 102 (in the case of the TRX amplifier 4-1) through an optical fiber, and converts the received light signal into an electric signal, and outputs the signal to the serial to parallel conversion section 203. Moreover, the photoelectric conversion section 201 converts an electric signal inputted from the serial to parallel conversion section 203 into a UL light signal, and sends out it from a slave port side.

The photoelectric conversion section 202 receives a UL light signal from a master port, the light signal being transmitted from a downstream TRX amplifier 4 through an optical fiber, and converts the received light signal into an electric signal, and outputs the signal to the serial to parallel conversion section 203. Moreover, the photoelectric conversion section 202 converts an electric signal inputted from the serial to parallel conversion section 204 into a DL light signal, and sends out it from the master port.

The photoelectric conversion sections 201 and 202 are typically in the same configuration, and for example, an SFP (Small Form factor Pluggable) optical transceiver can be used for them. The photoelectric conversion section 202 may directly receive a serial signal outputted by the photoelectric conversion section 201 and convert the serial signal into a DL light signal.

The serial to parallel conversion section (S/P) 203 reproduces a clock from an electric signal inputted from the photoelectric conversion section 201, and converts the electric signal into a parallel signal from a serial signal by 8B10B decoding, and then outputs the parallel signal to the DL header detection section 206, DL format conversion section 208, and S/P 204. Moreover, the S/P 203 converts a UL frame signal inputted from the format generation section 214 into a serial signal from a parallel signal by 8B10B encoding, and then outputs the serial signal to the photoelectric conversion section 201. An extracted clock is used for the 8B10B encoding, in addition, supplied to each section within the TRX amplifier 4. Clock frequency of the parallel signal is, for example, 16/Tc or 2, or 4 to 8 times as high as such frequency. Hereinafter, the clock is called operation clock.

The serial to parallel conversion section (S/P) 204 reconverts a DL frame signal being the parallel signal inputted from the S/P 203 into a serial signal, and then outputs the serial signal to the photoelectric conversion section 202. Moreover, the serial to parallel conversion section 204 converts the serial signal inputted from the photoelectric conversion section 202 to a parallel signal, and then outputs the parallel signal to the delay adjustment section 222 and the UL header detection section 224.

S/P 203 and S/P 204 are typically in the same configuration, and achieved by a device called Serdes.

The DL header detection section 206 detects DL header timing based on a signal inputted from the serial to parallel conversion section 203, and outputs BFN and HFN of the header to the DL format conversion section 208 and the offset processing section 210 with the header timing. Since the header is transmitted using K28.5 code being different from any other codes, it can be easily detected.

The DL format conversion section 208 performs format conversion of data inputted from the serial to parallel conversion section 204-1 based on the DL header timing inputted from the DL header detection section 206, so that the data are divided into DL_U plane data and DL_C plane data.

Moreover, the DL format conversion section 208 extracts IQ-data (A×C Container) for a TRX amplifier of the section 208 itself from IQ-data that was time-divisionally multiplexed into the divided DL_U plane data in a unit of basic frame, and then outputs the extracted IQ-data to the up-converter 218, and outputs the DL_C plane data to the control section 216.

The offset processing section 210 delays timing of a DL header from the DL header detection section 206 by time corresponding to Toffset (offset processing), and outputs the delayed DL header timing to the header generation section 212. Header timing outputted by the offset processing section 210 shows timing at which a header is to be outputted by the header generation section 212 or the format generation section 214, and actual delay time of the offset processing section 210 is smaller than Toffset.

The delay time Toffset is set by the control section 216 such that it (continuously) corresponds to T2$a$+Ta3 in a time unit of Tc/32 or less. T2$a$ depends on processing time in the DL format conversion section 208, offset processing section 210, header generation section 212, format generation section 214, transmission data delay adjustment section 232, and up-converter 218; and Ta3 depends on processing time of the down converter 220 and reception data delay adjustment section 234. That is, since T2$a$+Ta3 includes delay in an analog circuit, and thus the delay is hardly detected by the TRX amplifier 4 itself, T2$a$ and Ta3 are typically measured during manufacturing respectively, and stored in the storage section 230.

Based on the DL header timing delayed by the delay time Toffset, the header generation section 212 generates a UL header having the same BFN and HFN as those detected by the DL header detection section, and outputs the UL headers to the format generation section 214 and the phase difference detection section 226.

The transmission data delay adjustment section 232 gives a delay in the amount instructed by the control section 216 to the IQ-data inputted from the DL format conversion section 208, and then outputs the IQ-data to the up-converter 218. The delay can be adjusted in a time unit of Tc/32 or less.

The up-converter 218 up-samples IQ-data (baseband signal) inputted from the transmission data delay adjustment section 232, then performs filtering of a root rolloff characteristic and the like to the IQ-data, digital to analog conversion, orthogonal modulation of a radio frequency carrier, and amplification of power, and then outputs the IQ-data to the antenna 200.

The down-converter 220 performs processing such as low noise amplification, frequency conversion to intermediate frequency, analog to digital conversion, digital orthogonal demodulation, filtering, and down-sampling to a radio signal received by the antenna, then converts the radio signal into a baseband signal at a sample rate of 2/Tc, and then outputs the baseband signal to the format generation section 214. The baseband signal includes a CDMA signal transmitted by the mobile station 104.

The reception data delay adjustment section 234 gives a delay in the amount instructed by the control section 216 to the baseband signal inputted from the down-converter 220, and then outputs the baseband signal to the format generation section 214. The delay can be adjusted in a time unit of Tc/32 or less.

The reception data delay adjustment section 234 may be provided in the down-converter 220 while being combined with a digital filter, and the transmission data delay adjustment section 232 may be similarly provided in the up-converter 218. In such a case, a configuration described in JP-A-2006-174228 can be used as a configuration of the digital filter. While the transmission data delay adjustment section 232 and the reception data delay adjustment section 234 are not indispensable in the example, for example, they may be used for achieving T2a=Ta3=Toffset/2, or for allowing Toffset to correspond to integral multiple of Tc.

The UL header detection section 224 detects a UL header from the UL frame signal inputted from the S/P 204, and outputs the UL header to the phase difference detection section 226. The UL header detection section 224 can be in the same configuration as that of the DL header detection section 206.

The phase difference detection section 226 detects time difference (phase difference) Tphase between frame headers having the same BFN and HFN in a unit of Tc/32 or less, from format generation timing at the UL side from the header generation section 212 and timing of a UL header from the UL header detection section 224, and outputs the time difference to the delay adjustment section 222 and the control section 216. Again in the example, $Tphase^{(i)}$ detected in the TRX amplifier 4-i is expressed as $TBdelayDL^{(i)}+T12^{(i+1)}+Toffset^{(i+1)}+T34^{(i)}-Toffset^{(i)}$. Tphase is measured by adding 1 to a result of counting operation clock in a period of Tc/32 within time between timing obtained by delaying the timing from the header generation section 212 by ½ clock (Tc/64), and the timing from the UL header detection section 224. Counting time is lengthened by time corresponding to ½ clock, thereby error distribution is made plus/minus symmetric.

The delay adjustment section 222 delays the UL frame signal inputted from the S/P 204 based on Tphase, and outputs the delayed UL frame signal to the format generation section 214. For example, the delay corresponds to fraction delay Tfrc (obtained by subtracting a fraction of Tphase from Tc) of TBdelayDL. The delay adjustment section 222 typically includes a function of resetting clock of the UL frame signal inputted from the S/P 204 to clock based on the DL frame signal inputted from the S/P 203. The delay adjustment section 222 may perform simple control such as simple adjustment of header timing to a specified position without receiving input of Tphase, or may not be demonstratively provided in some cases.

The format generation section 214 receives the UL header from the header generation section 212, the IQ-data of the radio signal received by the TRX amplifier 4 itself from the down-converter 220, the UL frame signal optically transmitted from a downstream TRX amplifier 4 from the delay adjustment section 222, and the UL_C plane data from the control section, respectively.

The format generation section 214 buries the received IQ-data in an area (A×C Container) for the TRX amplifier of the section 214 itself, the area existing for each of basic frames configuring the received UL frame signal, and furthermore buries the IQ-data in the C plane of the UL frame signal when the section 214 receives the UL_C plane data, and substitutes the IQ-data for the header of the UL frame signal when it receives the UL header (in the case of HFN=0 and the like).

The format generation section 214 outputs a UL frame signal to upstream generated in such a way to the S/P conversion section 204-1 at a timing of a received UL header.

Since the UL frame signal received from the delay adjustment section 222 is in synchronization with a timing shown by the UL header received from the header generation section 212 in a unit of basic frame, the format generation section 214 easily generates a frame.

As a result, the IQ-data received from RB4 is outputted from RB3 while being delayed by TBdelayUL, and when TBdelayUL_min is assumed as delay in a unit of Tc specific to the format generation section 214, TBdelayUL can be expressed as TBdelayUL_min+Tfrc, and a possible value range of TBdelayUL is less than 1 Tc.

The storage section 230 stores an accurate value of delay amount of each section of the TRX amplifier 4 such as Toffset, TBdelayUL, TBdelayDL, TBdelayUL_min, T2a, Ta3, and Tphase, or TRB3 and TRB4 described later, and appropriately outputs it to the control section 216. Each of such values is (previously) obtained at accuracy of ±Tc/32 or accuracy being further fine compared with the relevant accuracy, and desirably handled such that an expectation value of an error in the value approaches 0, using a least significant bit in a weight being half the weight of a least significant bit when the value is obtained.

The control section 216 receives the DL_C plane data from the DL format conversion section 208, Tphase from the phase difference detection section 226, and Toffset, TBdelayDL, TBdelayUL_min, TRB3, TRB4 and the like from the storage section 230 respectively.

The control section 216 adds the fraction number Tfrc of the received Tphase, TBdelayUL_min, and respective small delay TRB3 and TRB4 (described later) in the ports RB3 and RB4, and determines a result of addition as TBdelayUL. Moreover, the control section 216 adds Tphase and TBdelayUL_min, then rounds up a fraction of an added value, and then divides the rounded-up value by a number corresponding to Tc, and determines a result of the divide as N.

When the control section 216 finds a processing delay information request in the received DL_C plane data, it makes processing delay information reports from the received Toffset, TBdelayDL, TBdelayUL, N and the like, and outputs the reports to the format generation section 214 as UL_C plane data.

Operation of the example is briefly described with reference to FIG. 6.

Figure 6:
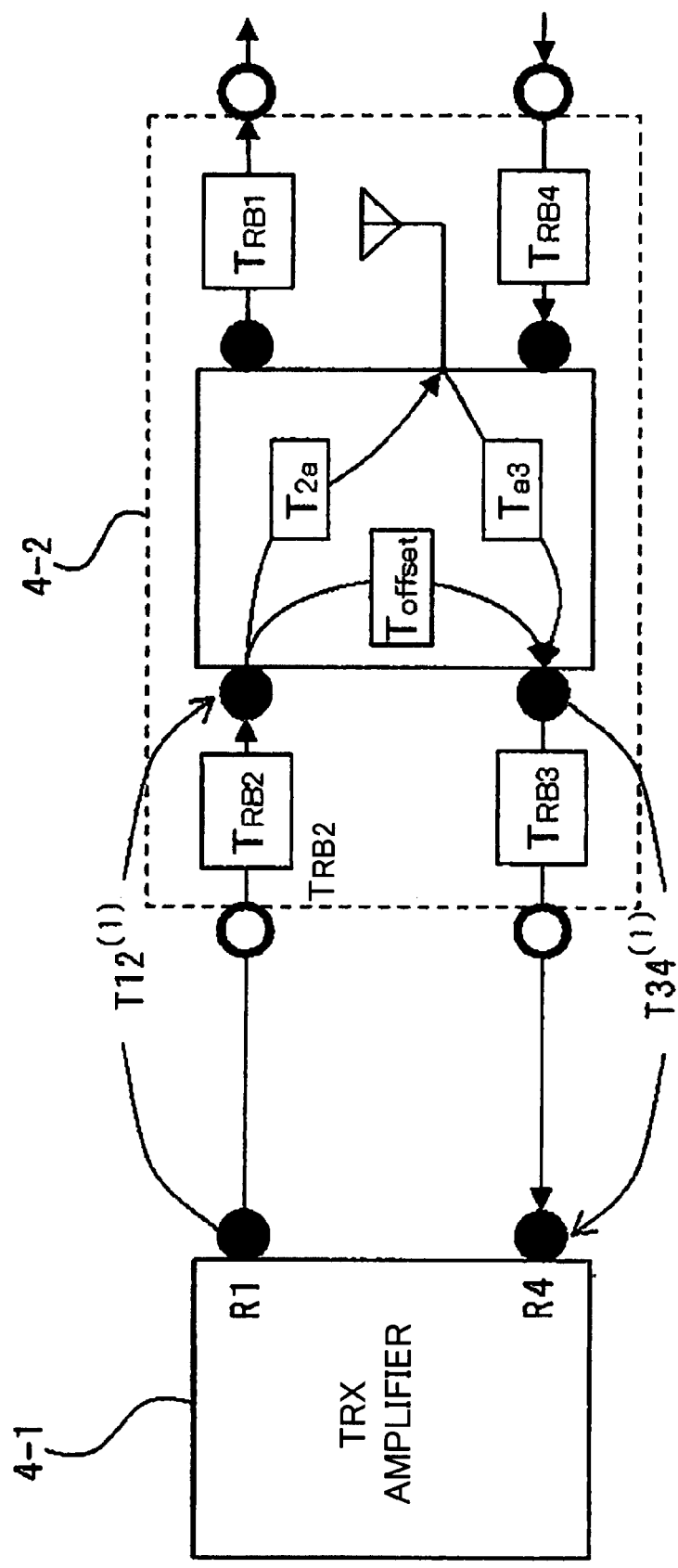
FIG. 6 is a diagram showing delay in an actual TRX amplifier 4.

FIG. 6 is a diagram showing delay in an actual TRX amplifier 4. The TRX amplifier 4 has particular kinds of small delay, which cannot be measured or controlled by the amplifier itself, particularly in each port, and they are expressed as TRB1, TRB2, TRB3 and TRB4. Such kinds of small delay are mainly in the photoelectric conversion section or the serial to parallel conversion section, and somewhat vary. However, a typical value of delay time can be often predicted based on information disclosed by manufactures. In the example, typical values of TRB1 to 4 are previously incorporated in TBdelayDL, Toffset and the like stored by the storage section 230, so that TRB1 to 4 are shown to be 0. That is, T2a stored by the storage section 230 includes TRB2, Ta3 includes TRB3, Toffset includes TRB2+TRB3, and TBdelayDL includes TRB2+TRB1. TBdelayUL is obtained by adding TRB3+TRB4 in the storage section 230 to TBdelayUL_min+Tfrc that can be measured by the amplifier 4 itself.

Furthermore, the photoelectric conversion section 201, serial to parallel conversion section 203 and the like are configured such that a cross-correlation coefficient between TRB1 and TRB4, and a cross-correlation coefficient between TRB2 and TRB3 are 0 or plus. This is achieved, for example, by using the same kind of components at the same conditions.

Thus, since Toffset, TBdelayDL, and TBdelayUL reported to the base transceiver station are not rounded down in fraction delay, expectation values of them are closer to true values.

In the base transceiver station, $T12^{(i+1)}$ and $T34^{(i+1)}$ can be calculated according to the following expression:

$$T12^{(i+1)} = (N^{(i)} + Toffset^{(i)} - Toffset^{(i+1)} - TBdelayUL^{(i)})/2,$$

$$T34^{(i+1)} + TBdelayUL^{(i)} = (N^{(i)} + Toffset^{(i)} - Toffset^{(i+1)} + TBdelayUL^{(i)})/2 \quad \text{(Expression 2)}.$$

According to the example 1, since delay in UL and DL can be obtained individually at high accuracy, even if the number of chains is increased, a possibility that accumulated errors exceed ±16 Tc can be extremely reduced.

Example 2

In a radio communication system 6 according to the example 2, Toffset in a TRX amplifier 7-1 is previously sufficiently increased, and Toffset in a downstream TRX amplifier 7 is stepwise decreased by delay time in a chain, thereby header timing is synchronized in all TRX amplifiers 7, that is, any N(i) is shown to be 0.

A configuration of the radio communication system 6 of the example 2 is the same as that of the example 1, and includes RNC 100, a base transceiver station B, TRX amplifiers 7-1 to 7-n, and mobile stations 104-1 to 104-m. Furthermore, a detailed configuration of each section is the same as in the example 1, if not otherwise specified.

The TRX amplifier 7 is different from the TRX amplifier 4 in the example 1 in the following points.

First, a storage section 430 corresponding to the storage section 230 stores a value (for example, 250 Tc) larger than total delay time in an optical fiber as an initial value $Toffset_0$ of Toffset. The $Toffset_0$ is far larger than Toffset in the example 1.

Second, a transmission data delay adjustment section 732 and a reception data delay adjustment section 734 corresponding to the transmission data delay adjustment section 232 and the reception data delay adjustment section 234 can produce sufficient delay amount so that T2a+Ta3 correspond to Toffset.

Third, when a control section 716 corresponding to the control section 216 finds a phase difference information request from the base transceiver station 102 in received DL_C plane data, it makes a phase difference information report from received N (or Tphase), and when it finds a processing delay information request, it makes a processing delay information report from received TBdelayDL, TBdelayUL and the like, and then outputs the reports to the format generation section 214 as UL_C plane data. If TBdelayDL and TBdelayUL in accordance with the usual CPRI standard are requested by the base transceiver station 102 after delay is adjusted by operation of the example, they are reported to be completely zero, and $Toffset_0$ is reported as Toffset.

Fourth, when the control section 716 finds a delay amount setting request from the base transceiver station 102 in the received DL_C plane data, the section 716 sets advance amount Tadj1 to the transmission data delay adjustment section 232, advance amount Tadj2 to the reception data delay adjustment section 234, and the advance amount Tadj1+Tadj2 to the offset processing section, each advance amount being shown by the request, in a subtractive manner with respect to current delay amount respectively. Thus, actual Toffset in the TRX amplifier 7 becomes $Toffset_0-(Tadj1+Tadj2)$ through first adjustment.

Next, the base transceiver station 8 of the example is described.

Figure 7:
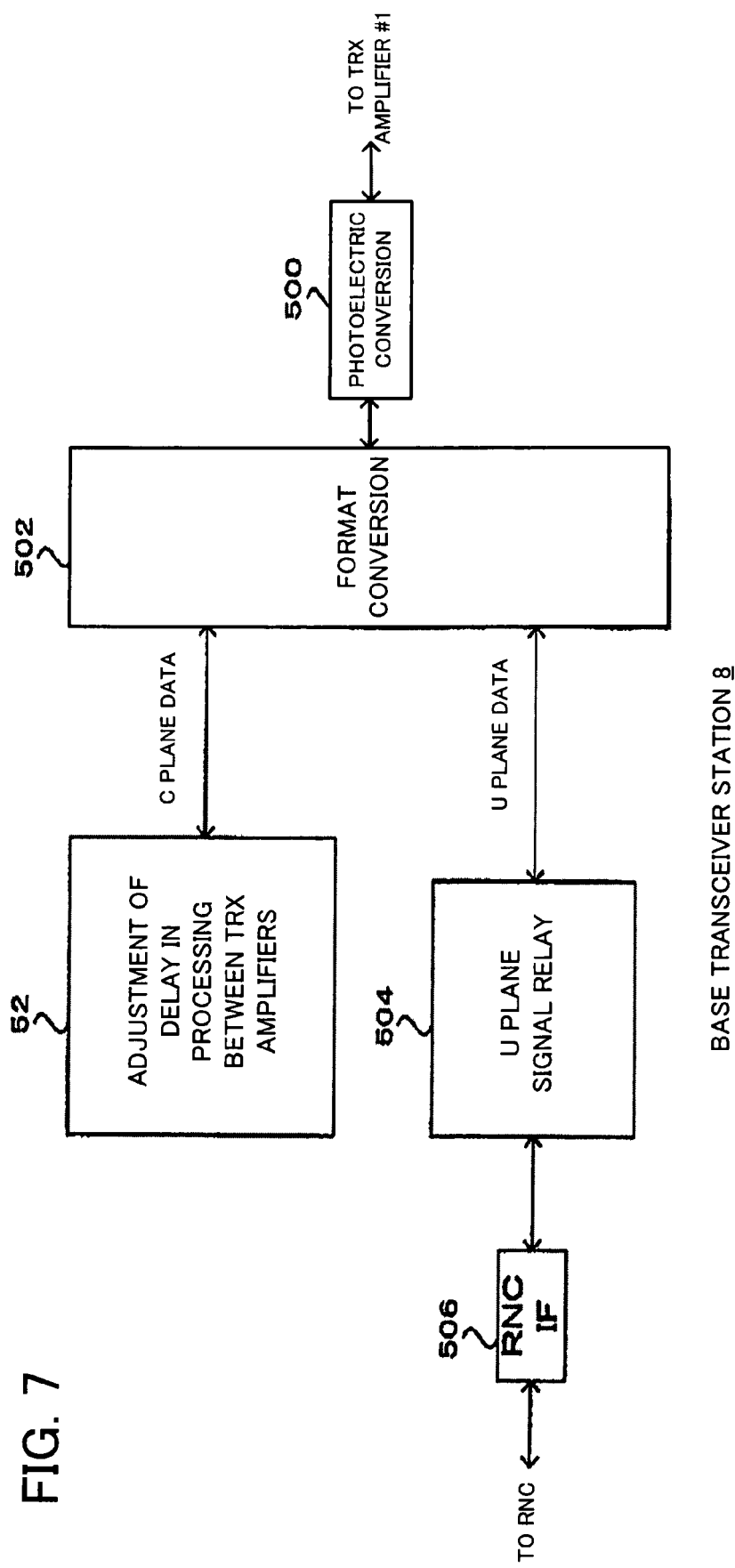
FIG. 7 is a block diagram of a base transceiver station 8 according to example 2.

FIG. 7 is a block diagram of the base transceiver station 8 according to the example 2.

As shown in FIG. 7, the base transceiver station 8 includes a photoelectric conversion section 500, format conversion section 502, processing delay control section, BS function section 504, and RNC interface (IF) 506.

The photoelectric conversion section 500 converts a light signal from the TRX amplifier 7-1 into an electric signal, and outputs the electric signal to the format conversion section 502, and converts an electric signal from the format conversion section 502 into a light signal, and outputs the light signal to the TRX amplifier 7-1.

A S/P conversion section 501 converts a serial signal from the photoelectric conversion section 500 into a parallel signal, and outputs the parallel signal to the format conversion section 502, in addition, performs conversion contrary to this. The photoelectric conversion section 500 and the S/P conversion section 501 are the same as those of the TRX amplifier 4.

The format conversion section 502 divides a UL frame signal from the S/P conversion section 501 into U plane data (U-plane (UL)) and C plane data (C-plane (UL)), and outputs the U plane data to the BS function section 504, and outputs the C plane data to the processing delay control section 52.

Moreover, the format conversion section 502 time-divisionally multiplexes the U plane data (U-plane (UL)) from the BS function section 504 and the C plane data (C-plane (UL)) from the processing delay control section 52 in a unit of basic frame to form a DL frame, and outputs the DL frame to the S/P conversion section 501.

As described later using FIG. 9, the processing delay control section 52 performs control necessary for adjusting delay in processing between the TRX amplifiers, and reports the delay to RNC in response to a macro instruction from the RNC.

The BS function section 504 is a section for achieving a basic function of the base transceiver station similarly as usual one, and performs setting or cancellation of a call according to macro from the RNC. For UL, the BS function section 504 extracts a call signal from IQ-data sent from each TRX amplifier 7, and outputs the call signal to RNCIF, and for DL, it performs processing contrary to that for UL, and outputs IQ-data to the format conversion section 502.

The RNCIF 506 performs processing to data from the BS function section 504, the processing being necessary for transmitting the data to RNC 100, and then it transmits the data to the RNC 100. In addition, the RNCIF 506 receives data from the RNC 100, and outputs the data to the BS function section 504.

Figure 8:
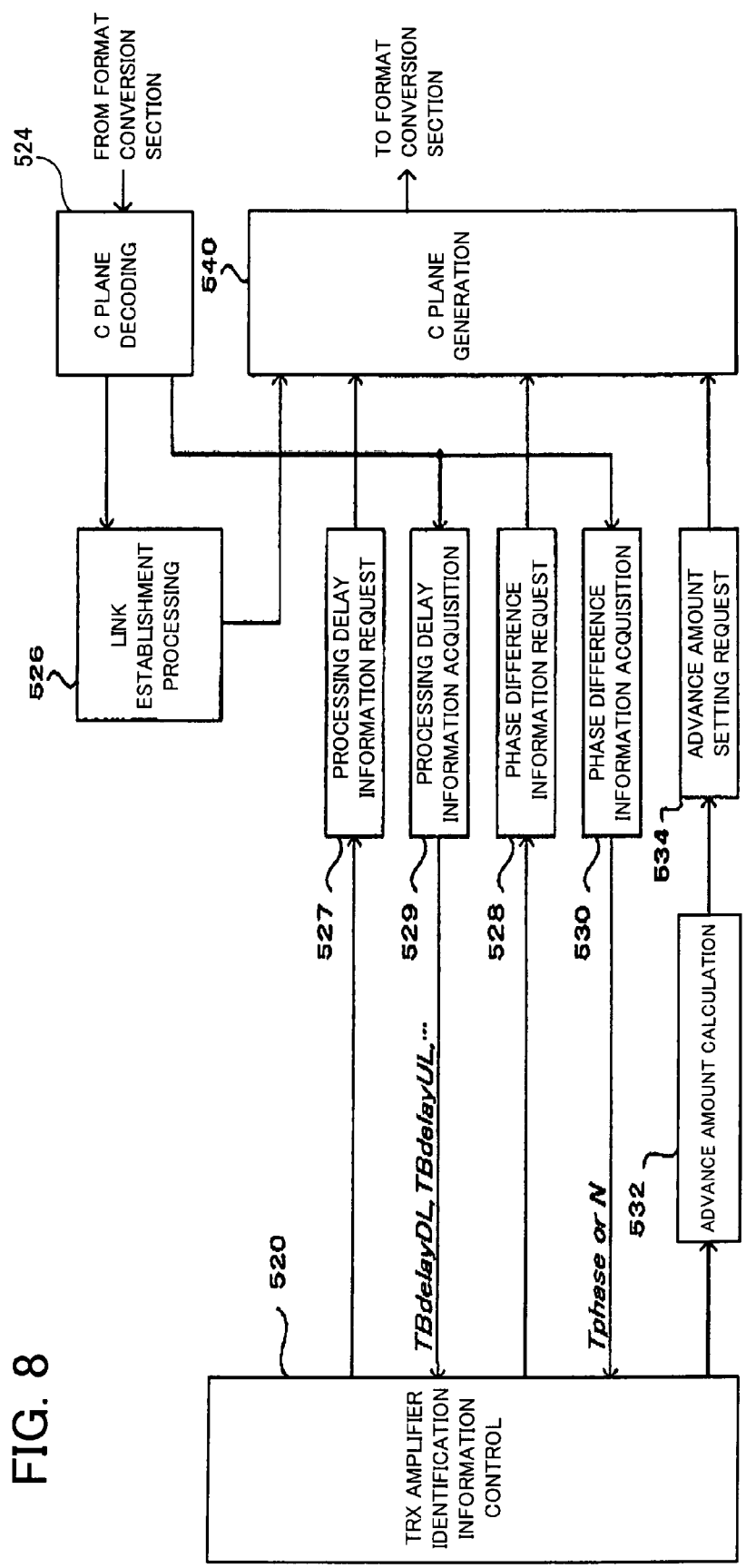
FIG. 8 is a block diagram of a processing delay control section 52 according to the example 2.

FIG. 8 is a block diagram of the processing delay control section 52 shown in FIG. 5.

As shown in FIG. 8, the processing delay control section 52 includes a TRX amplifier information control section 520, a C plane decoding section 524, a link establishment processing section 526, a phase difference information request section 528, a phase difference information acquisition section 530, an advance amount calculation section 532, an advance amount setting request section 534, an advance amount setting completion notice acquisition section 536, and C plane generation section 540.

The C plane decoding section 524 is inputted with U-plane (UL) from the format conversion section 502. and processes a Slow or Fast C&M link subchannel or the like according to a corresponding protocol, and outputs the processed subchannel to the link establishment processing section 526, a processing delay information acquisition section 529, and the phase difference information acquisition section 530. HDLC is used for the Slow C&M link, and Ethernet (trade name) is used for the Fast C&M link, either of which is a connection-oriented, reliable protocol.

The link establishment processing section 526 performs link establishment processing on a layer 2 link using the Slow or Fast C&M link subchannel with respect to all the TRX amplifiers 7 based on data from the C plane decoding section 524. When a signal is transmitted to the TRX amplifier 7-$i$, the signal is transmitted to the TRX amplifier 7-$i$ by relaying the TRX amplifiers 7-1 to 7-($i$−1) on layer 1 as described before, and the same processing is performed in transmission and reception of subsequent signals.

While a link establishment processing means on layer 1 to the TRX amplifier 7-1 is not shown, it is implemented according to a standard using Synchronization and timing or L1 inband protocol.

The processing delay information acquisition section 529 monitors data from the C plane decoding section 524, and when the section 529 detects a processing delay information report, it notifies the report and a TRX amplifier 7 at a source of the report to the TRX amplifier information control section 520.

The phase difference information acquisition section 530 monitors data from the C plane decoding section 524, and when the section 530 detects a phase difference information report, it notifies the report and a TRX amplifier 7 at a source of the report to the TRX amplifier information control section 520.

The TRX amplifier information control section 520 controls information of each of all the TRX amplifiers 7-1 to 7-$n$ connected to the base transceiver station 8. Specifically, the section 520 transmits a processing delay information request to each of the TRX amplifiers 7-$i$ to which a link is established, and when the section 520 is inputted with a processing delay information report as a response to the request from the processing delay information acquisition section 529, it stores TBdelayDL$^{(i)}$ and TBdelayUL$^{(i)}$ included in the report while relating them to a TRX amplifier 7-$i$. Moreover, the TRX amplifier information control section 520 transmits a phase difference information request to each of the TRX amplifiers 7-$i$, and when the section 520 is inputted with a phase difference information report as a response to the request from the phase difference information acquisition section 530, it stores N$^{(i)}$ included in the report while relating it to a TRX amplifier 7-$i$. Then, the section 520 provides TBdelayDL$^{(i)}$ or Tphase$^{(i)}$ obtained from each of the TRX amplifiers 7 to the advance amount calculation section 532 or the BS function section 504.

Moreover, the TRX amplifier information control section 520 may calculate TBdelayDL+T12 or T34+TBdelayUL in a method based on CPRI from Toffset, N, TBdelayDL, and TBdelayUL (while it is eventually calculated to be 0).

When a processing delay information request section 527 receives a processing delay information request to a TRX amplifier 7-$i$ from the TRX amplifier information control section 520, the section 527 converts the request into a layer 2 frame to the TRX amplifier 7-$i$, and outputs it to the C plane generation section 540.

When the phase difference information request section 528 receives a phase difference information request to a TRX amplifier 7-$i$ from the TRX amplifier information control section 520, the section 528 converts the request into a layer 2 frame to the TRX amplifier 7-$i$, and outputs it to the C plane generation section 540.

The advance amount calculation section 532 estimates cable delay based on the TBdelayDL$^{(i)}$ and N$^{(i)}$ inputted from the TRX amplifier information control section 520, and calculates advance amount Tadj$_1^{(i+1)}$ and Tadj$_2^{(i+1)}$ set in a TRX amplifier 7-($i$+1).

The advance amount Tadj$_1$ and Tadj$_2$ are calculated by the following expression assuming that an advance direction is positive. However, it is assumed that Tadj$_1^{(i)}$ is previously reflected in TRX amplifiers 7-$i$ except for the TRX amplifier 7-1.

$$Tadj_1^{(i+1)} = Tc \cdot N^{(i)}/2 - (TBdelayUL^{(i)} - TBdelayDL^{(i)})/2,$$

$$Tadj_2^{(i+1)} = Tc \cdot N^{(i)}/2 + (TBdelayUL^{(i)} - TBdelayDL^{(i)})/2 \quad \text{(Expression 3)}.$$

Alternatively, when a plurality of TRX amplifiers 7-1 to 7-$n$ are simultaneously started, advance amount Tadj$_1$, Tadj$_2$ can be collectively obtained according to the following expression.

[Numerical Expression 1]

$$T_{adj1}^{(i+1)} = \qquad \text{(Expression 4)}$$
$$\frac{1}{2}\sum_{j=1}^{i} (Tc \cdot N^{(j)} - TBdelayUL^{(j)} + TBdelayDL^{(j)})$$

$$T_{adj1}^{(i+1)} =$$
$$\frac{1}{2}\sum_{j=1}^{i} (Tc \cdot N^{(j)} + TBdelayUL^{(j)} - TBdelayDL^{(j)})$$

The advance amount setting request section 534 makes an advance amount setting request of advance amount Tadj$_1^{(i+1)}$, Tadj$_2^{(i+1)}$ to each of the TRX amplifiers 7-($i$+1), and converts the request into a layer 2 frame, and then outputs the frame to the C plane generation section 540.

The C plane generation section 540 outputs signals from the link establishment processing section 526, phase difference information request section 528, and advance amount setting request section 534 to the format conversion section 502 as C plane data.

The advance amount setting completion notice acquisition section 536 (not shown) monitors data from the C plane decoding section 524, and when the section 536 detects an advance amount setting completion report, it notifies the report and a TRX amplifier 7 at a source of the report to the TRX amplifier information control section 520.

Figure 9:
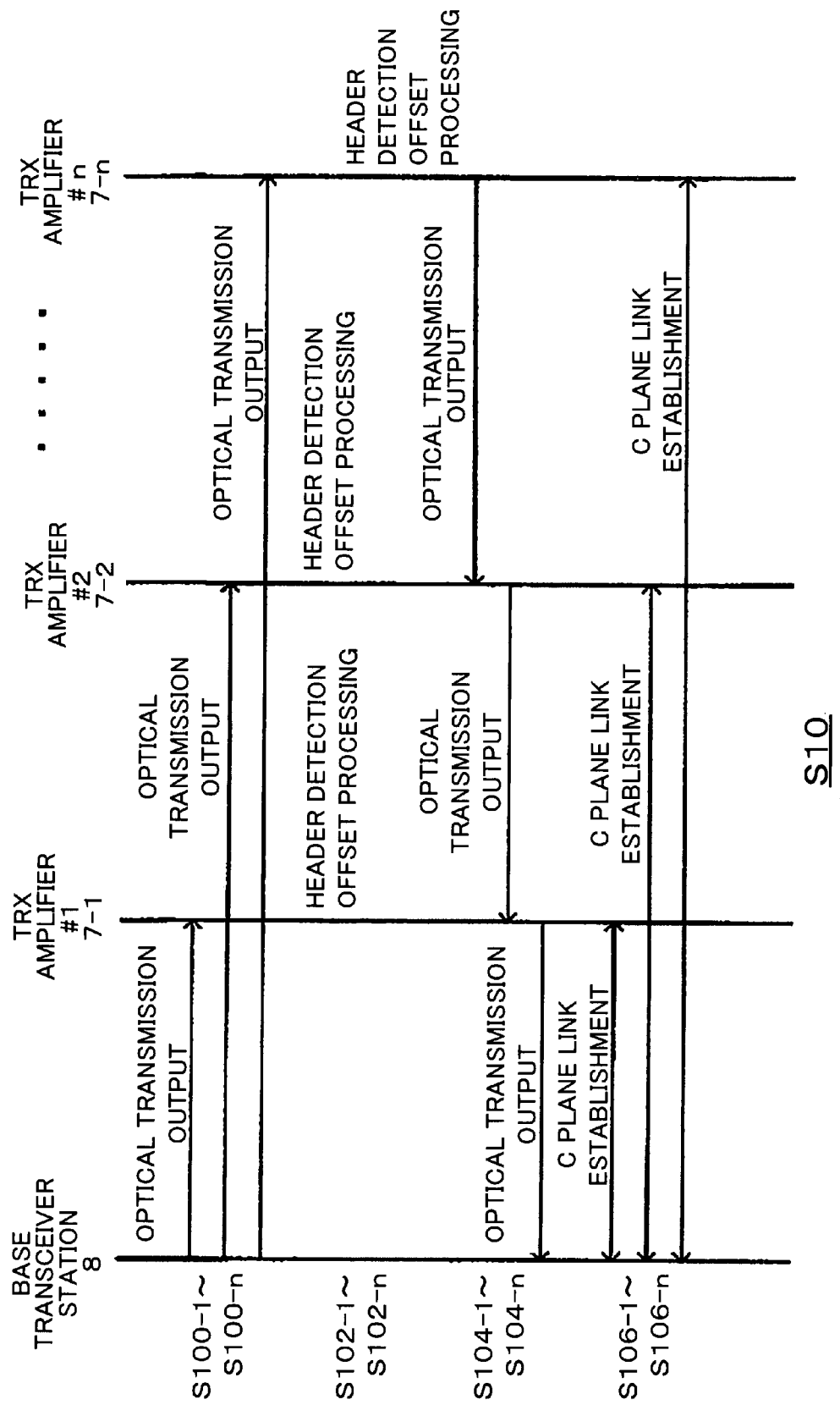
FIG. 9 is a sequence diagram showing operation for establishing a C plane link to each TRX amplifier by the base transceiver station 8 according to the example 2.

FIG. 9 is a sequence diagram showing operation (S10) to a point when the base transceiver station 8 establishes a C plane link to each of the TRX amplifiers 7-1 to 7-$n$ after a system is started in the radio communication system 6 according to the example 2.

As shown in FIG. 9, in steps 100-1 to 100-$n$ (S100-1 to 100-$n$), the base transceiver station 8 optically transmits a DL frame signal including a DL header and DL_C plane data to each of the TRX amplifiers 7-1 to 7-$n$.

In steps 102-1 to 102-$n$, each of the TRX amplifiers 7-1 to 7-$n$ receives the DL frame signal, detects the DL header, and furthermore performs offset processing.

In steps 104-1 to 104-$n$, each of the TRX amplifiers 7-1 to 7-$n$ optically transmits a UL frame signal to the base transceiver station 8 at frame timing being delayed by an initial value of Toffset from the received DL frame signal.

In steps 106-1 to 106-$n$, the base transceiver station 8 monitors a synchronous condition of a communication line (layer 2) based on the UL frame signal received from each of the TRX amplifiers 7-1 to 7-$n$, and when synchronization is achieved, it establishes a C plane link to each of the TRX amplifiers 7-1 to 7-$n$ in cooperation with each of the TRX amplifiers 7. The C plane link is established by handshake or the like through a plurality of exchanges of telegrams, and such a condition is shared among the base transceiver station 8 and respective TRX amplifiers 7.

FIG. 10 is a sequence diagram showing operation (S20) that the base transceiver station 8 sets advance amount to the TRX amplifier 7-($i$+1) in the radio communication system 6 according to the example 2.

As shown in FIG. 10, in step 200 (S200), the TRX amplifier 7-$i$ measures phase difference Tphase between a UL header generated by a header generation section 212 of the amplifier itself, and a UL header received from the TRX amplifier 7-($i$+1), as in the example 1. In the terminal TRX amplifier 7-$n$, since a master port is not inputted with anything, phase difference need not be measured.

In step 202-1, the base transceiver station 8 transmits a processing delay information request to the TRX amplifier 7-1 using the C plane link.

In step 204-1, the TRX amplifier 7-1 that has received the processing delay information request transmits the TBdelayDL$^{(i)}$ stored in the storage section 230 and the TBdelayUL$^{(i)}$ obtained in the same way as in the example 1 to the base transceiver station 8 as a processing delay information report using the C plane link.

After that, the same processing is sequentially performed to the respective TRX amplifiers 7-$i$ as step 202-$i$ and step 204-$i$.

In step 206, the base transceiver station 8 transmits a phase difference information request to the TRX amplifiers 7-$i$ except for the terminal TRX amplifier 7 using the C plane link.

In step 208, the TRX amplifier 7-$i$ that has received the phase difference information request transmits the N$^{(i)}$ calculated in S200-$i$ to the base transceiver station 8 as a phase difference information report using the C plane link.

After that, the same processing is sequentially performed to the respective TRX amplifiers 7-$i$ as step 206-$i$ and step 208-$i$.

In step 210, the base transceiver station 8 calculates the advance amount Tadj$_1^{(i+1)}$ and Tadj$_2^{(i+1)}$ to be set to the TRX amplifier 7-($i$+1) according to the expression 4.

In step 212-1, the base transceiver station 8 requests the TRX amplifier 7-2 to set the advance amount Tadj$_1^{(i+1)}$ and Tadj$_2^{(i+1)}$.

In step 214-1, in response to a request of the base transceiver station 8, the TRX amplifier 7-2 sets the advance amount Tadj$_1$ to the transmission data delay adjustment section 232, the advance amount Tadj$_2$ to the reception data delay adjustment section 234, and the advance amount Tadj$_1$+Tadj$_2$ to the offset processing section in a subtractive manner with respect to current delay amount respectively.

In step 216-1, the base transceiver station 8 acquires an advance amount setting completion notice from the TRX amplifier 7-2.

In step 218-1, the base transceiver station 8 performs operation start processing to the TRX amplifier 7-2 that was able to acquire the advance amount setting completion notice, and starts operation with the TRX amplifier 7-2.

After that, the same processing is sequentially performed to the respective TRX amplifiers 7-($i$+1) as step 212-$i$, step 214-$i$, and step 216-$i$. Furthermore, the base transceiver station 8 appropriately performs the operation start processing to the TRX amplifier 7-1.

After that, processes from S202 to S218 may be performed regularly, or performed when N≠0 is detected. On the assumption that a base transceiver station cannot normally receive a report of N being negative, a range that can be adjusted by the delay adjustment section 222 may be 2 Tc.

In the example, since Tadj$_1$+Tadj$_2$ is in a unit of Tc, Tfrc$^{(i)}$ is not changed before and after setting of Tadj$_1^{(i+1)}$ and Tadj$_2^{(i+1)}$. When setting of advance amount is requested to the TRX amplifier 7, N$^{(i)}$ and (TBdelayUL$^{(i)}$−TBdelayDL$^{(i)}$) may be notified rather than Tadj$_1$ and Tadj$_2$.

As described hereinbefore, in the example, TBdelayDL$^{(i)}$+T12$^{(i+1)}$ or T34$^{(i+1)}$+TBdelayUL$^{(i)}$ is seen to be 0, thereby N$^{(i)}$ becomes 0. Thus, site diversity can be performed in the base transceiver station 8 even if difference in delay is not considered, memory capacity for holding signals can be extremely reduced compared with a case that difference in delay is considered.

Example 3

In summary, a radio communication system 6 according to the example 3 is a system in which delay adjustment similar to that in the example 2 is performed without using TBdelayUL, and N$^{(i)}$ is not necessarily 0.

A configuration of the radio communication system of the example 3 is the same as that of the example 2, and includes RNC 100, a base transceiver station 8, TRX amplifiers 9-1 to 9-$n$, and mobile stations 104-1 to 104-$m$. Furthermore, a detailed configuration of each section is the same as in the example 2, if not otherwise specified.

The TRX amplifier 9 is different from the TRX amplifier 7 in the example 2 in the following points.

First, when a control section 916 corresponding to the control section 716 finds a phase difference information request from the base transceiver station 102, it makes a phase difference information report from received Tphase, and when it finds a processing delay information request, it makes a processing delay information report from received TBdelayDL. If TBdelayDL in accordance with the usual CPRI standard is requested by the base transceiver station 102 after delay is adjusted by operation in the example, Toffset$_0$ is reported as Toffset.

Second, when the control section 916 finds a delay amount setting request from the base transceiver station 102 in a received DL_C plane data, the section 916 sets the advance amount Tadj3+Tadj4 to the transmission data delay adjustment section 232, the advance amount Tadj4 to the reception data delay adjustment section 234, and the advance amount 2 Tadj3+Tadj4 to the offset processing section, each advance amount being shown by the request, in a subtractive manner with respect to a current delay respectively.

The base transceiver station 8 is different from the base transceiver station 8 in the example 2 in the following points.

First, when a TRX amplifier information control section 820 corresponding to the TRX amplifier information control section 520 is inputted with a processing delay information report from the processing delay information acquisition section 529, the section 820 stores the processing delay as TBdelayDL$^{(i)}$, and when the section 820 is inputted with a phase difference information report from the phase difference information acquisition section 530, the section 820 stores the phase difference as Tphase$^{(i)}$, and provides the TBdelayDL$^{(i)}$ or Tphase$^{(i)}$ to a advance amount calculation section 832 or the BS function section 504.

Second, the advance amount calculation section 832 is provided in place of the advance amount calculation section 532, which calculates Tadj$_3^{(i+1)}$ and Tadj$_4^{(i+1)}$ according to the following expression.

$$Tadj_3^{(i+1)}=Tphase^{(i)}/2$$

$$Tadj_4^{(i+1)}=TBdelayDL^{(i)} \quad\quad\quad (\text{Expression 5})$$

Alternatively, when a plurality of TRX amplifiers 9-1 to 9-n are simultaneously started, advance amount Tadj$_3$ can be collectively obtained according to the following expression.

[Numerical Expression 2]

$$T_{adj3}^{(i+1)} = \frac{1}{2}\sum_{j=1}^{l}(Tphase^{(j)})$$ (Expression 6)

Third, an advance amount setting request section 834 is provided in place of the advance amount setting request section 534, which makes an advance amount setting request of advance amount Tadj$_3^{(i+1)}$ and Tadj$_4^{(i+1)}$ to each of TRX amplifiers 9-(i+1), then converts the request into a layer 2 frame and outputs it to the C plane generation section 540.

In the example, TBdelayDL$^{(i)}$ is directly given to the transmission data delay adjustment section 732 as advance amount, while it is normally to be set such that delay of TBdelayDL$^{(i)}$/2 is given to the transmission data delay adjustment section 732, and advance of TBdelayDL$^{(i)}$/2 is given to the reception data delay adjustment section 734.

In the example, a value approximately equal to Tphase$^{(i)}$ is subtracted from current Toffset$^{(i+1)}$, thereby Tphase$^{(i)}$ is seen to be approximate 0. If Tphase$^{(i)}$ is exactly subtracted, when delay fluctuates even slightly, N$^{(i)}$ may be varied, therefore it is subtracted slightly excessively (by TBdelayDL$^{(i)}$/2). Therefore, Tphase after setting Tadj$_3$ and Tadj$_4$ becomes slightly negative, and Tfrc is caused thereby. Moreover, TBdelayUL becomes TBdelayUL_min. Again in the example, when the TRX amplifier 9-i reports a true value of TBdelayUL or the like to the base transceiver station 8, cable delay in UL can be appropriately obtained and compensated by a usual method, in the base transceiver station 8. The true value of TBdelayUL is made integer multiple of Tc, thereby errors can be kept small even if number of significant figures of TBdelayUL is small.

The invention can be used for a communication system required to have high accuracy in time domain, in addition, can be used for a system using MIMO (Multiple Input Multiple Output).

What is claimed is:

1. A radio communication system in which a signal is transmitted and received between an adjustment node and a plurality of measurement nodes, and each of the measurement nodes transmits and receives a radio signal with respect to at least one mobile node;
    wherein when each of the plurality of measurement nodes receives a signal from one of other measurement nodes, the measurement node relays the received signal to one of the measurement nodes other than the relevant measurement node, or the adjustment node, and when the measurement node receives a signal from the adjustment node, the measurement node relays the received signal to one of other measurement nodes, and
    each of the measurement nodes comprises
    a phase difference detection means for detecting phase difference between the received signal and the relayed signal,
    a phase difference notice means for notifying the detected phase difference to the adjustment node, and
    a timing adjustment means for adjusting timing at which a signal received from the mobile node is transmitted to another measurement node based on correction amount sent from the adjustment node,
    and the adjustment node comprises,
    a correction amount calculation means for calculating correction amount for correcting the notified phase difference, and
    a correction amount transmission means for transmitting the calculated correction amount to a measurement node that relayed a signal to a measurement node by which the phase difference was notified.

2. An overhang station apparatus used for a radio communication system comprising a base transceiver station, and a plurality of overhang station apparatuses that are in daisy chain connection to the base transceiver station through digital optical transmission paths, and perform transmission and reception of radio signals with respect to terminals in cells being formed respectively, comprising:
    a slave interface circuit that is connected to an upstream chain, and performs reception of a downlink frame, transmission of an uplink frame, light to electricity conversion, and serial to parallel conversion,
    a second interface circuit that is connected to a downstream chain, and performs transmission of a downlink frame, reception of an uplink frame, light to electricity conversion, and serial to parallel conversion, and outputs a master frame to a downstream chain, the master frame being directly derived from the slave interface circuit without accompanying regeneration of a frame,
    a format conversion circuit for extracting radio signal data to be transmitted by the relevant overhang station apparatus from a frame inputted from the slave interface circuit,
    an up-conversion circuit for up-converting radio signal data inputted from the format conversion circuit to radio frequency, and outputting the up-converted data to an antenna,
    a down-conversion circuit for down-converting a radio signal received from the antenna,
    a transmission data delay adjustment circuit for adjusting time T2a being time from a point when radio signal data were inputted into the slave interface circuit to a point when the data are sent out from the antenna,
    a reception data delay adjustment circuit for adjusting time Ta3 being time from a point when radio signal data were inputted into the antenna to a point when the data are sent out from the slave interface circuit,
    an offset circuit for allowing time Toffset to substantially correspond to sum of the time T2a and the time Ta3, the time Toffset being time from a point when a downlink frame was inputted into the slave interface circuit to a point when an uplink frame corresponding to the relevant downlink frame is outputted from the slave interface circuit,
    a phase difference detection circuit for measuring time Tphase being time from a point when an uplink frame was outputted from the slave interface circuit to a point when an uplink frame corresponding to the relevant uplink frame is inputted into a master interface circuit, and
    a control circuit for reporting time TBdelayDL and a numerical value based on the time Tphase to the base transceiver station, the time TBdelayDL being time from a point when a downlink frame was inputted into the slave interface circuit to a point when an uplink frame corresponding to the downlink frame is outputted from the slave interface circuit.

3. The overhang station apparatus according to claim 2:
    wherein the control circuit reports the time Toffset, the time TBdelayDL, time TBdelayUL, and an integer value corresponding to sum of the time Tphase and the time TBdelayUL to the base transceiver station, the time TBdelayUL being time from a point when an uplink frame including certain radio signal data was inputted into the slave interface circuit to a point when an uplink frame including the radio signal data is outputted from the slave interface circuit, each of the master interface circuit and the slave interface circuit has delay time errors in uplink and delay time errors in downlink, the errors in uplink and downlink being zero or in a positive correlation, and the time TBdelayDL and the time TBdelayUL include average values of delay time in the master interface circuit and the slave interface circuit.

4. The overhang station apparatus according to claim 2:

wherein the control circuit reports an initial value of the time Toffset, the time TBdelayDL, time TBdelayUL, and an integer value N corresponding to sum of the time Tphase and the time TBdelayUL to the base transceiver station, the time TBdelayUL being time from a point when an uplink frame including certain radio signal data was inputted into the slave interface circuit to a point when an uplink frame including the radio signal data is outputted from the slave interface circuit, and sets delay requested from the base transceiver station to the transmission data delay adjustment circuit and the reception data delay adjustment circuit, and in response to time TBdelayDL, time TBdelayUL, and N reported from an overhang station apparatus, the base transceiver station requests an overhang station apparatus being next downstream with respect to the relevant overhang station apparatus to decrease delay in the transmission data delay adjustment circuit by $Tc \cdot N/2 - (TBdelayUL - TBdelayDL)/2$, and decrease delay in the reception data delay adjustment circuit by $Tc \cdot N/2 + (TBdelayUL - TBdelayDL)/2$.

5. The overhang station apparatus according to claim 2:

wherein the control circuit reports an initial value of the time Toffset, the time TBdelayDL, and the time Tphase to the base transceiver station, and sets delay requested from the base transceiver station to the transmission data delay adjustment circuit and the reception data delay adjustment circuit, and in response to time TBdelayDL, time TBdelayUL, and N reported from an overhang station apparatus, the base transceiver station requests an overhang station apparatus being next downstream with respect to the relevant overhang station apparatus to decrease delay in the transmission data delay adjustment circuit by $Tphase/2 + TBdelayDL$, and decrease delay in the reception data delay adjustment circuit by $Tphase/2$.

* * * * *